May 28, 1929.   F. KUSTERLE   1,715,070
SIDE AND END RAIL LOCK FOR BEDSTEADS
Filed March 19, 1928
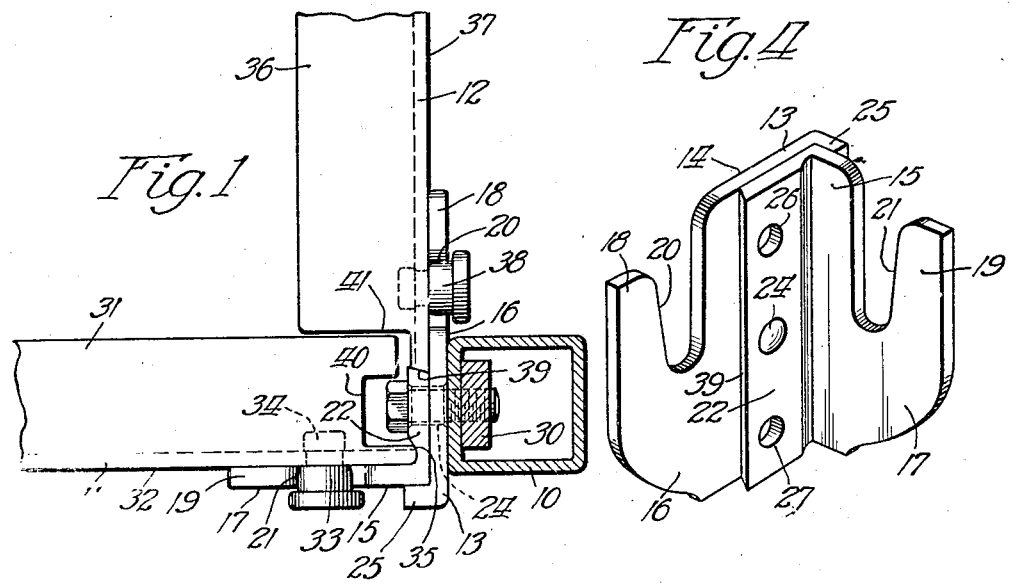
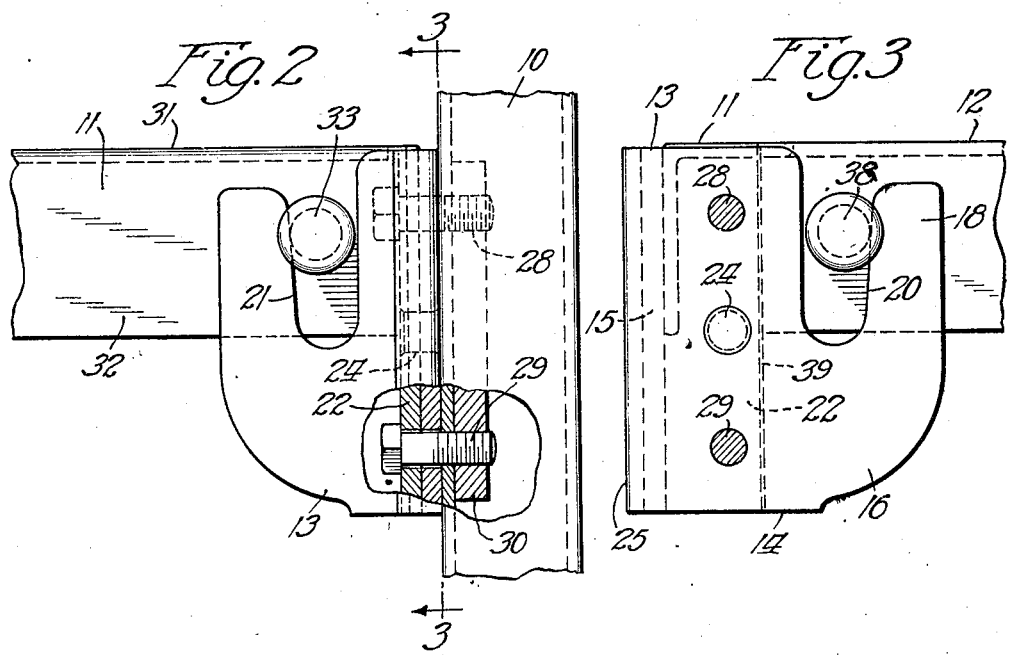
Inventor
Frank Kusterle
Fisher, Towle, Clapp & Soans
Attys.

Patented May 28, 1929.

1,715,070

UNITED STATES PATENT OFFICE.

FRANK KUSTERLE, OF KENOSHA, WISCONSIN, ASSIGNOR TO SIMMONS COMPANY, OF NEW YORK, N. Y., A CORPORATION OF DELAWARE.

SIDE AND END RAIL LOCK FOR BEDSTEADS.

Application filed March 19, 1928. Serial No. 262,736.

This invention relates to side and end rail locks for connecting side and end rails to the corner posts or other frame parts of a bedstead and has for one of its objects, to provide a side and end rail lock which will permit assembling or disassembling of the bedstead, without the use of tools or other special equipment. Another object is to provide a lock of the above mentioned type which is relatively light in weight, yet strong and rigid, and capable of tightly locking and rigidly connecting the side and end rails of a bed bottom in their proper position relative to the corner post of a bedstead. Still another object of the invention is to provide a side and end rail lock construction which will permit the various parts to be compactly nested for packing and to facilitate transporting of same.

It is a general object of the present invention to provide a side and end rail lock construction which can be cheaply and economically manufactured in large quantities with relatively simple machinery and to provide a generally improved lock construction of the class described.

Other objects and advantages will be understood by reference to the following specification and accompanying drawing in which I have illustrated a side and end rail lock for bedsteads embodying the features of my invention.

In the drawings:

Fig. 1 is a plan.

Fig. 2 is a side elevation.

Fig. 3 is a section on the line 3—3 of Fig. 2.

Fig. 4 is a perspective of a bracket member.

Referring now to the drawings, I have shown a corner post 10 preferably of tubular metal construction which constitutes part of the main supporting frame of a bedstead. Side and end rails 11 and 12 are connected to the corner post 10 through the agency of a bracket 13.

The bracket 13 is formed of an outer member 14 and an inner member 15 which members include wing portions 16 and 17 respectively, provided with hook members 18 and 19 having inclined edge portions 20 and 21 respectively. The wing portion 17 of the inner bracket member is provided with an inwardly, laterally extending flange 22 which is seated against the inner face of the wing 16 of the outer bracket member. The two bracket members are preferably secured together by means of a rivet or spot welding, as indicated at 24, or in any other suitable manner. The outer bracket member 14 is provided with a flange portion 25 which projects laterally from the wing portion 16 and overlies or extends over the adjacent outer face portion of the wing 17 of the inner bracket member.

The flange 22 and wing 16 of the inner and outer bracket members are apertured as indicated at 26 and 27 for receiving bolts such as shown at 28 and 29 for securing the bracket to the corner post 10. The corner post is preferably apertured to receive the bolts and a reinforcing or nut member 30 is provided on the inside of the post member for threadedly receiving the inner ends of the bolts 28 and 29. The reinforcing nut member 30 is of course apertured and tapped in the proper places to receive the bolts 28 and 29 and serves with the bolts to rigidly secure the bracket member in place on the corner post.

The side and end rails 11 and 12 are preferably of angle iron construction, the side rail 11 having a horizontal flange 31 and a vertical flange 32. A headed pin or stud 33 projecting horizontally from the vertical flange 11 is secured thereto in any suitable manner, for instance, by passing a shank portion of the stud through a suitable aperture in the flange and heading the inner end of the stud as shown at 34. The stud 33 is adapted to engage the inclined edge 21 of the inner bracket member and thereby to move the side rail endwise towards the flange portion 22 of the said inner bracket member 15. The end of the vertical flange 32 is thereby jammed into engagement with the inner face of the flange 22, which is preferably provided with an inclined portion 35, which serves to crowd the outer face of the vertical flange 32 into intimate engagement with the inner face of the wing of the adjacent bracket member.

The end rail 12, also being preferably of angle iron construction, includes a horizontal flange 36 and a vertical flange 37, to which is secured a suitable stud 38. The stud 38 is adapted to engage the inclined edge 20 of the outer bracket member and thereby to move the end rail 12 endwise whereby the end of the vertical flange is jammed into engagement with the adjacent edge 39 of the flange portion 32 of the inner bracket member. The said edge 39 is preferably inclined so that the vertical flange 37 is crowded into intimate engagement with the inside walls of the wing portion 16 of the outer bracket member 14. The endwise movement of the end rail 12 which is imparted by the inclined edge 20 tends to move the inner bracket member across the inside face of the wing 16 of the outer bracket member, such relative movement imparting a strain on the rivet or other connection 24, between the inner and outer bracket members. The overlying flange 25 of the outer bracket member is effective to reinforce the fastening means 24, and to prevent such movement between the bracket members and thereby to prevent shearing or breaking of the fastening 24.

It will be apparent that the side and end rails 11 and 12 will be effectively locked in the desired position relative to each other and relative to the corner post by the above described lock. The wedging action of the inclined portions 20, 21, 35 and 39 is operative to effect rigid and fast connection between the respective rails and bracket members, and the rails may readily be dismounted when desired. It will also be noted that the rails may be inverted so that the horizontal flanges will extend inwardly from the lower edge of the respective vertical flanges when such arrangement is desired. The horizontal flange 31 of the side rail 11 is recessed or notched as shown at 40 so that the said horizontal flange may pass beyond the head of the bolt 28, if the side rail is to be inverted and the horizontal flange 36 of the end rail 12 is recessed as shown at 41 so that it will not overlap a portion of the horizontal flange 31 of the side rail 11. It will also be understood that the bracket may be so arranged on the corner post that the inner portion 15 of the bracket member will serve to connect the end rail to the post instead of connecting the side rail to the post, as above described.

I am aware that changes may be made in the form construction and arrangement of the above described parts without departing from the spirit of the invention, for which reason the scope of the same should be determined by reference to the following claims which should be construed as broadly as possible consistent with the state of the art.

I claim as my invention:

1. In bedstead construction, the combination of a corner post, a bracket secured to said corner post for demountably connecting side and end rails to the corner post, said bracket comprising a member including a wing portion and a flange extending laterally therefrom adjacent one end, a second member also including a wing portion and a flange portion extending laterally therefrom, one of said members being disposed in the corner of the other with its wing and flange portions respectively engaging the flange and wing portions of the other, each of the wing portions being provided with a hook member having an inclined edge, angle iron side and end rails each having a stud projecting laterally from its vertical flange and adapted to engage the hook member of one of said wing portions, the inclined edges of said hook members being effective to force the respective rails endwise towards the angles of the respective bracket members, the vertical flange of one of said rails being jammed into engagement with the inner face of the flange portion of the bracket member to which the rail is connected and the vertical flange of the other rail being jammed into engagement with the adjacent edge portion of the flange against which the end of the first mentioned rail is jammed.

2. In bedstead construction, the combination of a main supporting frame including a a corner post, a bracket for demountably connecting side and end rails to said corner post, said bracket comprising an outer member having a hook portion provided with an inclined edge, an inner member including a wing and a flange extending laterally from the wing, said flange being seated against the inner face of said outer member, said inner bracket wing portion also being provided with a hook having an inclined edge, an angle iron rail including a horizontal and a vertical flange, a stud projecting laterally from said vertical flange and engaging the inclined edge of the hook of said inner wing member whereby the end of the vertical flange is jammed against the inner face of the flange of said inner bracket member, a second angle iron rail also having a horizontal and a vertical flange, a stud projecting laterally from the vertical flange of said last mentioned rail and adapted to engage the inclined edge of the hook of said outer bracket member whereby the end of the vertical flange of said second rail is jammed against the adjacent end of the flange of said inner bracket member, said outer bracket member being provided with a laterally extending flange overlying a portion of the wing of the inner member so as to prevent relative movement of said inner and outer bracket members as an incident to the endwise movement of said second rail.

3. In bedstead construction, the combination of a main supporting frame including a corner post, a bracket for demountably connecting side and end rails to said corner post, said bracket comprising an outer member having a hook portion provided with an inclined edge, an inner member including a wing and a flange extending laterally from the wing, said flange being seated against the inner face of said outer member and secured thereto, said inner bracket wing portion also being provided with a hook having an inclined edge, an angle iron rail including a horizontal and a vertical flange, a stud projecting laterally from said vertical flange and engaging the inclined edge of the hook of said inner wing member whereby the end of the vertical flange is jammed against the inner face of the flange of said inner bracket member, a second angle iron rail also having a horizontal and a vertical flange, a stud projecting laterally from the vertical flange of said last mentioned rail and adapted to engage the inclined edge of the hook of said outer bracket member whereby the end of the vertical flange of said second rail is jammed against the adjacent end of the flange of said inner bracket member, said outer bracket member being provided with a laterally extending flange overlying a portion of the wing of the inner member so as to prevent relative movement of said inner and outer bracket members and thereby to prevent separation of said bracket members as an incident to the endwise movement of said second rail.

4. In bedstead construction, the combination of a main supporting frame including a corner post, means for demountably connecting side and end rails to said corner post, said means comprising a two part bracket member consisting of inner and outer bracket members each including a wing portion and a flange extending laterally from said wing portion, said inner bracket member being disposed in the corner of the outer bracket member with the flange and wing of the inner member disposed respectively against the wing and flange of the outer member, each of said bracket members being provided with an open ended slot forming a hook having an inclined edge portion, an angle iron rail having a horizontal and a vertical flange, a stud projecting outwardly from the vertical flange of said rail and adapted to engage the inclined edge of the hook of the inner bracket member, thereby to jam the end of the vertical flange against the face of the flange of said inner bracket member, a second angle iron rail also having a horizontal and a vertical flange and a stud projecting laterally from said vertical flange, the stud of said second rail being adapted to engage the inclined edge of the hook of the outer bracket member, thereby to jam the end of the vertical flange of said second rail against the end of the flange portion of the inner bracket member, the flange portion of said inner member being provided with beveled seats for receiving the ends of said vertical flanges and said beveled seats being effective to crowd the vertical flanges of the angle iron rails into intimate engagement with the respective bracket wings, thereby to rigidly lock the respective rails in fixed position relative to each other and relative to the bedstead frame.

FRANK KUSTERLE.